United States Patent [19]

Vanmaele

[11] Patent Number: 5,366,951
[45] Date of Patent: Nov. 22, 1994

[54] THIAZOLYLAZOANILINE DYES FOR USE IN THERMAL DYE SUBLIMATION TRANSFER

[75] Inventor: Luc Vanmaele, Lochristi,

[73] Assignee: AGFA-Gevaert, N.V., Mortsel,

[21] Appl. No.: 74,453

[22] Filed: Jun. 10, 1993

[30] Foreign Application Priority Data

Jul. 14, 1992 [EP] European Pat. Off. ........ 92202156.3

[51] Int. Cl.⁵ .................... B41M 5/035; B41M 5/38
[52] U.S. Cl. .................................. 503/227; 428/195; 428/500; 428/522; 428/913; 428/914
[58] Field of Search .............. 8/471; 428/195, 500, 428/522, 913, 914; 503/227; 534/573, 794

[56] References Cited

U.S. PATENT DOCUMENTS 4,764,178  8/1988  Gregory et al. ................ 8/471

*Primary Examiner*—B. Hamilton Hess
*Attorney, Agent, or Firm*—Breiner & Breiner

[57] ABSTRACT

Dye-donor element for use according to thermal dye sublimation transfer comprising a support having thereon a dye layer containing a thiazolylazoaniline dye, said thiazolylazoaniline dye containing on the 4-position of the thiazolyl ring a substituent selected from the group consisting of hydroxy, alkoxy, cycloalkoxy, aryloxy, mercapto, thioalkyl, thiocycloalkyl and thioaryl.

10 Claims, No Drawings

THIAZOLYLAZOANILINE DYES FOR USE IN THERMAL DYE SUBLIMATION TRANSFER

DESCRIPTION

1. Field of the Invention

The present invention relates to dye-donor elements for use according to thermal dye sublimation transfer and more particularly to novel magenta and cyan dyes for use in said dye-donor elements.

2. Background of the Invention

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, which may be coated on one or both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye layer, which contains the printing dyes.

The dye layer can be a monochrome dye layer or it may comprise sequential repeating areas of different dyes like e.g. of cyan, magenta, yellow and optionally black hue. When a dye-donor element containing three or more primary color dyes is used, a multicolor image can be obtained by sequentially performing the dye transfer process steps for each color.

Any dye can be used in such a dye layer provided it is easily transferable to the dye-image-receiving layer of the receiver sheet by the action of heat.

Typical and specific examples of dyes for use in thermal dye sublimation transfer have been described in, e.g., EP 432829, EP 432314, EP 400706, EP 485665, EP 453020, EP 209990, EP 209991, EP 216483, EP 218397, EP 227095, EP 227096, EP 229374, EP 235939, EP 247737, EP 257577, EP 257580, EP 258856, EP 279330, EP 279467, EP 285665, U.S. Pat. Nos. 4743582, 4753922, 4753923, 4757046, 4769360, 4771035, JP 84/78894, JP 84/78895, JP 84/78896, JP 84/227490, JP 84/227948. JP 85/27594, JP 85/30391, JP 85/229787, JP 85/229789, JP 85/229790, JP 85/229791, JP 85/229792, JP 85/229793, JP 85/229795. JP 86/41596. JP 86/268493, JP 86/268494, JP 86/268495 and JP 86/284489.

Thiazolylazoaniline dyes have been described for use in thermal dye sublimation transfer printing, e.g., in EP 453020, EP 216483, EP 258856, EP 352006 and EP 442360. The described thiazolylazoaniline dyes contain a halogen substituent (usually chlorine) on the thiazolyl ring (usually in 4-position). It has been found that halogen-containing dyes are detrimental for the thermal head. Moreover, halogen-containing dyes are also detrimental for ecological reasons.

It is an object of the present invention to provide thiazolyazoaniline dyes for use in thermal dye sublimation transfer printing not having the disadvantages mentioned above.

Other objects will become apparent from the description hereinafter.

3. Statement of the Invention

In accordance with the present invention a dye-donor element for use according to thermal dye sublimation transfer is provided, said dye-donor element comprising a support having thereon a dye layer containing a thiazolylazoaniline dye, characterized in that said thiazolylazoaniline dye contains on the 4-position of the thiazolyl ring a substituent selected from the group consisting of hydroxy, alkoxy, cycloalkoxy, aryloxy, mercapto, thioalkyl, thiocycloalkyl and thioaryl.

Dye-donor elements according to the present invention provide high-density images with good stability. Further said dye-donor elements do not damage the thermal head and are ecologically acceptable.

4. Detailed Description of the Invention

In a preferred embodiment of the invention, the thiazolylazoaniline dyes correspond to the following formula (I)

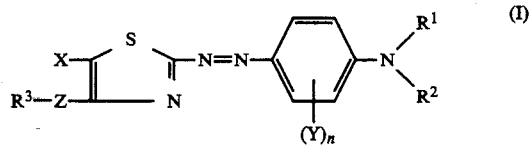

wherein

X represents CN or $R^4-C=A$;

Y represents any substituent, e.g. SH, OH, $NH_2$, halogen. CN, $NO_2$, alkyl, carbonamido, sulfonamido, acylamino, alkoxy, thioalkoxy;

Z represents O or S;

n represents 0, 1, 2, 3 or 4, the Y substituents being the same or different when n is greater than 1;

A represents O, $N-R^5$, $CR^6R^7$;

$R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;

$R^3$ represents hydrogen, substituted or unsubstituted alkyl, substituted or unsubstituted cycloalkyl, substituted or unsubstituted aryl;

$R^4$ represents hydrogen or an electron withdrawing group, such as a CN, halogen, $NO_2$, alkyloxycarbonyl, alkylcarbonyl;

$R^5$ represents H, CN, $NR^8R^9$, $OR^8$, $OCOR^8$, $OCOOR^8$, $OCONR^8R^9$, $OSO_2R^8$, $OPO(OR^8)(OR^9)$;

$R^6$ and $R^7$ independently represent an electron withdrawing group such as CN, $CO_2R^8$, $CONR^8R^9$, $NO_2$, $COR^8$, $PO(OR^8)(OR^9)$, $SO_2R^8$, $SO_3R^8$;

$R^8$ and $R^9$ independently represent hydrogen, substituted or unsubstituted alkyl, substituted or unsubstituted aryl, substituted or unsubstituted cycloalkyl or $R^8$ and $R^9$ together represent the atoms necessary for completing a heterocyclic nucleus or substituted heterocyclic nucleus.

Preferably $R^1$ and $R^2$ represent hydrogen, alkyl, cycloalkyl or aryl, including these groups in substituted form. Suitable examples of $R^1$ and $R^2$ are i.a. hydrogen, methyl, ethyl, propyl, isopropyl, butyl, isobutyl, sec.butyl, pentyl, hexyl, 2-methoxyethyl, benzyl, 2-(methylsulfonylamino)ethyl, 2-hydroxyethyl, 2-cyanoethyl, methoxycarbonylmethyl, cyclohexyl, cyclopentyl, cycloheptyl, phenyl, pyridyl, naphthyl, 4-(2'-methoxyethyloxy)-phenyl.

Suitable examples of $R^3$ are i.a. hydrogen, methyl, ethyl, propyl, isopropyl, butyl, pentyl, hexyl, t-butyl, 2-methoxyethyl, 2-cyanoethyl, benzyl, 2-hydroxyethyl.

Suitable examples of $R^4$ are i.a. hydrogen or CN.

Suitable examples of $R^5$ are i.a. $NR^8R^9$ with $R^8$ and $R^9$ both representing hydrogen alkyl (e g. methyl, ethyl) $OCO_2R^8$ with $R^8$ representing alkyl (e.g. ethyl) or aryl (e.g. phenyl), $OCONR^8R^9$ with $R^8$ representing hydrogen and $R^9$ representing aryl, $OR^8$ with $R^8$ representing hydrogen or alkyl (e.g. isopropyl), $OCOR^8$ with $R^8$ representing alkyl (e.g. methyl).

Suitable examples of $R^6$ and $R^7$ are i.a. CN, $CO_2R^8$ with $R^8$ representing alkyl (e.g. ethyl).

Preferably X represents CN or CHO or $CH=C(CN)_2$ or $C(CN)=C(CN)_2$ or $CH=N-OCH_3$ or $CH=N-OH$, Z represents O, $R^3$ represents methyl, n is O and $R^1$ and $R^2$ both represent alkyl (e.g. butyl).

Dyes included within the scope of the present invention are listed in table 1, table 2, and table 3.

TABLE 1

| No.dye | $R^1$ | $R^2$ | $R^3$ | $R^4$ | A | n | Y |
|---|---|---|---|---|---|---|---|
| 1 | $CH_3$ | $CH_3$ | $CH_3$ | H | O | 0 | |
| 2 | $C_2H_5$ | $C_2H_5$ | " | " | " | " | |
| 3 | $C_4H_9$ | $C_4H_9$ | " | " | " | " | |
| 4 | $C_4H_9$ | $C_6H_5-OCH_2CH_2OCH_3$ | " | " | " | " | |
| 5 | $C_4H_9$ | $C_6H_{11}$ | " | " | " | " | |
| 6 | $C_4H_9$ | $CH(CH_3)C_2H_5$ | " | " | " | " | |
| 7 | $C_4H_9$ | $CH_2CH(CH_3)_2$ | " | " | " | " | |
| 8 | $C_4H_9$ | $C_4H_9$ | " | " | " | 1 | 2-$CH_3$ |
| 9 | $C_4H_9$ | $C_4H_9$ | " | " | " | 1 | 2-$OCH_3$ |
| 10 | $C_4H_9$ | $C_4H_9$ | " | " | " | 1 | 2-$NHCOCH_3$ |
| 11 | $C_2H_5$ | $C_2H_5$ | $C_2H_5$ | H | O | 0 | |
| 12 | $C_4H_9$ | $C_4H_9$ | $CH_3$ | CN | $C(CN_2)$ | 0 | |
| 13 | $C_4H_9$ | $C_4H_9$ | $CH_3$ | CN | $C(CN)_2$ | 1 | 2-$NHCOCH_3$ |
| 14 | $C_4H_9$ | $C_4H_9$ | $CH_3$ | CN | $C(CN)COOCH_3$ | 0 | |
| 15 | $C_4H_9$ | $C_4H_9$ | $CH_3$ | H | $C(CN)_2$ | 0 | |
| 16 | $C_4H_9$ | $C_4H_9$ | $CH_3$ | H | $C(CN)CO_2C_2H_5$ | 0 | |
| 17 | $C_2H_5$ | $C_2H_5$ | $CH_3$ | H | O | 1 | 2-$NHCOCH_3$ |
| 18 | $C_2H_5$ | $C_2H_5$ | $CH_3$ | H | $N-OCH_3$ | 1 | 2-$NHCOCH_3$ |
| 19 | $C_4H_9$ | $C_4H_9$ | $C_4H_9$ | H | O | 0 | |
| 20 | $CH_3$ | $CH_3$ | $CH_3$ | CN | $C(CN)_2$ | 0 | |
| 21 | " | " | " | H | $C(CN)_2$ | " | |
| 22 | " | " | " | " | $C(CN)COOCH_3$ | " | |
| 23 | " | " | " | " | $N-OCH_3$ | " | |
| 24 | " | " | " | " | $N-OC_4H_9$ | " | |
| 25 | " | " | " | " | $N-OCOCH_3$ | " | |
| 26 | " | " | " | " | $N-OCONHC_6H_5$ | " | |
| 27 | " | " | " | " | $N-OCO_2C_6H_5$ | " | |
| 28 | $CH_3$ | $CH_3$ | $CH_3$ | H | $N-OCO_2C_2H_5$ | " | |
| 29 | " | " | " | " | $N-N(CH_3)_2$ | " | |
| 30 | $C_4H_9$ | $C_4H_9$ | $CH_3$ | H | $N-N(CH_3)_2$ | 0 | |
| 31 | " | " | " | " | $N-OCH_2CH_2C_6H_5$ | " | |
| 32 | " | " | " | " | $N-OCO_2C_2H_5$ | " | |
| 33 | " | " | " | " | $N-OCONHC_6H_5$ | " | |
| 34 | " | " | " | " | $N-OH$ | " | |
| 35 | " | " | " | " | $N-OC_4H_9$ | " | |
| 36 | " | " | " | " | $N-OCH_3$ | " | |
| 37 | " | " | " | " | $N-OCH(CH_3)_2$ | " | |
| 38 | " | " | " | " | $N-OCOCH_3$ | " | |
| 39 | " | " | " | " | $N-OCH_3$ | 1 | 2-$NHCOCH_3$ |
| 40 | $C_4H_9$ | $C_2H_4OCH_3$ | $CH_3$ | H | $N-N(CH_3)_2$ | 0 | |
| 41 | " | " | " | " | $N-OCH_2CH_2C_6H_5$ | " | |
| 42 | " | " | " | " | $N-OCO_2C_2H_5$ | " | |
| 43 | " | " | " | " | $N-OCONHC_6H_5$ | " | |
| 44 | " | " | " | " | $N-OH$ | " | |
| 45 | " | " | " | " | $N-OCH_3$ | " | |
| 46 | " | " | " | " | $N-OCOCH_3$ | " | |
| 47 | $C_4H_9$ | $C_2H_4OCH_3$ | $CH_3$ | CN | $C(CN)_2$ | 0 | |
| 48 | $C_4H_9$ | $C_2H_4OCH_3$ | $CH_3$ | CN | $C(CN)CO_2C_2H_5$ | 0 | |
| 49 | $C_4H_9$ | $C_2H_4OCH_3$ | $C_2H_5$ | CN | $C(CN)_2$ | 0 | |
| 50 | $C_4H_9$ | $C_2H_4OCH_3$ | $CH_3$ | CN | $C(CN)_2$ | 1 | 2-$OCH_3$ |
| 51 | 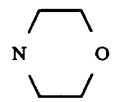 | | $CH_3$ | H | $N-OCH_3$ | 0 | |

TABLE 1-continued

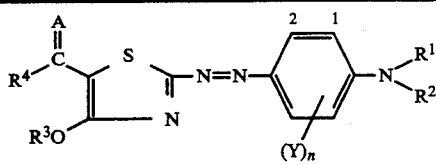

| No.dye | R¹ | R² | R³ | R⁴ | A | n | Y |
|---|---|---|---|---|---|---|---|
| 52 | " | | $CH_3$ | H | $N-N(CH_3)_2$ | 0 | |
| 53 | " | | $CH_3$ | CN | $C(CN)_2$ | 0 | |
| 54 | " | | $CH_3$ | H | $C(CN)_2$ | 0 | |
| 55 | " | | $CH_3$ | H | $N-OCO_2C_2H_5$ | 0 | |
| 56 | " | | $CH_3$ | H | O | 0 | |
| 57 | " | | $CH_3$ | H | N—N⟨piperidine⟩ | 0 | |
| 58 | $C_4H_9$ | $C_4H_9$ | $CH_3$ | H | $N-OSO_2CH_3$ | 0 | |
| 59 | " | " | " | " | $N-CN$ | 0 | |
| 60 | " | " | " | " | $N-OCH_3$ | 2 | 1-$OCH_3$ 4-$NHCOCH_3$ |

TABLE 2

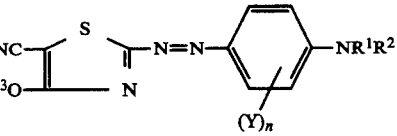

| No.dye | R¹ | R² | R³ | n | Y |
|---|---|---|---|---|---|
| 61 | $CH_3$ | $CH_3$ | $CH_3$ | 0 | |
| 62 | $C_2H_5$ | $C_2H_5$ | " | " | |
| 63 | $C_4H_9$ | $C_4H_9$ | " | " | |
| 64 | $C_4H_9$ | $C_6H_5-OCH_2CH_2OCH_3$ | " | " | |
| 65 | $C_4H_9$ | $C_6H_{11}$ | " | " | |
| 66 | $C_4H_9$ | $CH(CH_3)C_2H_5$ | " | " | |
| 67 | $C_4H_9$ | $CH_2CH(CH_3)_2$ | " | " | |
| 68 | $C_4H_9$ | $C_2H_5$ | " | " | |
| 69 | $C_4H_9$ | $C_4H_9$ | " | 1 | 2-$OCH_3$ |
| 70 | $C_4H_9$ | $C_4H_9$ | " | 1 | 2-$NHCOCH_3$ |
| 71 | $C_4H_9$ | $C_4H_9$ | " | 1 | 2-$CH_3$ |
| 72 | $C_4H_9$ | $C_4H_9$ | $C_2H_5$ | 0 | |
| 73 | $C_4H_9$ | $C_4H_9$ | $C_4H_9$ | 0 | |
| 74 | $C_4H_9$ | $CH(CH_3)C_2H_5$ | $CH_3$ | 0 | |
| 75 | $C_4H_9$ | $C_2H_4OCH_3$ | $CH_3$ | 0 | |
| 76 | N—O (morpholino) | | $CH_3$ | 0 | |
| 77 | $C_2H_5$ | $C_2H_5$ | $CH_3$ | 1 | 2-$NHCOCH_3$ |
| 78 | $C_4H_9$ | $C_4H_9$ | $CH_3$ | 2 | 1-$OCH_3$ 4-$NHCOCH_3$ |

TABLE 3

Dye no.

TABLE 3-continued

79

Dyes according to formula (I) generally are of magenta or cyan hue (see table 4 hereinafter). Generally dyes according to formula (I) wherein A represents $CR^6R^7$ are of cyan hue.

These dyes are also useful as filter dyes for silver halide color photographic materials and also as antihalation dyes. Further after functionalization with hydrophilic groups these dyes can be used in inkjet printing.

Dyes according to formula (I) can be prepared according to scheme 1. The synthesis of the dyes I in scheme 1, i.e. 4-chloro,5-formylthiazol-2-ylazoaniline dyes, is described in U.S. Pat. Nos. 4395544 and 4505857.

Scheme 1

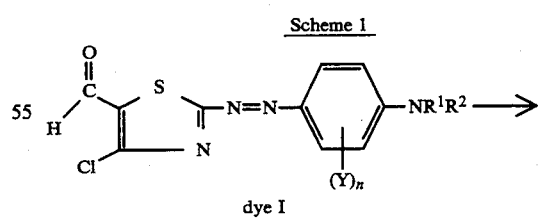

dye I

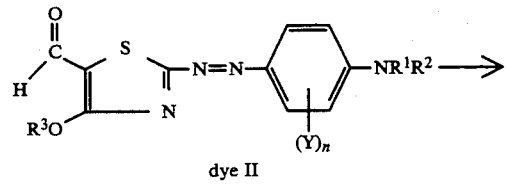

dye II

-continued
Scheme 1

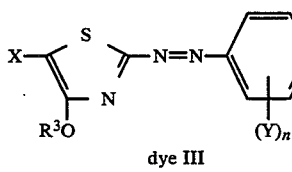

dye III

It has now been found that the halogen group in dyes I of scheme 1 can be substituted with the anion of the alcohol $R^3OH$, resulting in halogen-free dyes II (especially for the $R^3$ representing methyl). The aldehyde group in dyes II of scheme 1 can be derivatised by methods known in the art of organic synthesis, resulting in dyes III of scheme 1; this will become apparent from the examples given hereinafter.

According to a preferred embodiment of this invention the halogen-free thiazolylazoaniline dyes are used in the dye layer of a dye-donor element for thermal dye sublimation transfer.

The thiazolylazoaniline dyes according to the present invention can be used in colored dye layer areas of magenta or cyan hue. One or more of the present dyes can be used in such a dye layer, possibly in combination with other types of magenta or cyan dyes, respectively.

If the present cyan thiazolylazoaniline dyes are used in a cyan dye-donor element especially in combination with indoaniline dyes they have a favourable effect in eliminating catalytic fading effects and in increasing light stabilities, as described in our copending European patent application filed on the same day as the present application.

The present thiazolylazoaniline dyes can also be used for compounding so-called black dye-donor elements containing a mixture of yellow, magenta and cyan dyes, such as described in EP 453020. The magenta and/or cyan thiazolylazoaniline dye of the present invention can then be used in admixture with cyan dyes and/or magenta dyes and possibly yellow dyes. Examples of suitable magenta dyes to be used in said mixture include aryl and heterocyclic N,N-dialkylaniline azo dyes such as described in EP 216483 and EP 235939 and bis azo dyes such as described in EP 218397. Examples of suitable cyan dyes to be used in said mixture include indoaniline dyes such as described in US 4829047, EP 453020, EP 393252, EP 384990, EP 394563 and European patent application no. 92201111.9. Examples of suitable yellow dyes to be used in said mixture include dicyanovinylaniline dyes such as described in EP 258856, EP 318032 and JP 60/31563, azo dyes such as described in EP 432314, EP 432829 and in our copending European patent application filed on the same day as the present application.

Preferably the black dye-donor element contains one or more magenta thiazolylazoaniline dye according to the present invention, a cyan indoaniline dye, a yellow dicyanovinylaniline dye and a yellow bis(N,N-dialkylaniline)azo dye. In a preferred embodiment of the present invention the black dye-donor element contains the following dyes: D3, D36, C2, Y2 and Y3 (C2, Y2 and Y3 being defined hereinafter in the examples).

The dye layer of the present dye-donor element is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed generally has a thickness of about 0.2 to 5.0 $\mu$m, preferably 0.4 to 2.0 $\mu$m, and the amount ratio of dye to binder is generally between 9:1 and 1:3 by weight, preferably between 3:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyreneacrylonitrile; polysulfones; polyphenylene oxide; organosilicones, such as polysiloxanes; epoxy resins and natural resins, such as gum arabic. Preferably the dye layer contains copolystyreneacrylonitrile or cellulose esters as binder.

The dye layer may also contain other additives, such as thermal solvents, stabilizers, curing agents, preservatives, organic or inorganic fine particles, dispersing agents, antistatic agents, defoaming agents, and viscosity-controlling agents, these and other ingredients being described more fully in EP 133011, EP 133012, EP 111004 and EP 279467.

Especially preferred organic fine particles for use in the dye layer are polyethylene, polypropylene, or amide wax particles.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 $\mu$m.

The support may also be coated with an adhesive or subbing layer, if desired. A suitable subbing layer contains a copolyester of terephthalic acid, isophthalic acid, ethylene glycol and neopentyl glycol and optionally 1,2-dihydroxybenzene.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/-subbing layers.

Preferably the reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4567113, 4572860, and 4717711.

Preferably the reverse side of the support is coated with the following subsequent layers in order to prevent sticking from the dye-donor element to the thermal head: a subbing layer, a heat-resistant layer and a top layer. Suitable subbing layers can be choosen from the classes of polyester resins, polyurethane resins, polyester urethane resins, modified dextrans, modified cellulose, and copolymers comprising recurring units such as i.a. vinylchloride, vinylidenechloride, vinylacetate, acrylonitrile, methacrylate, acrylate, butadiene and styrene (e.g. poly(vinylidenechloride-co-acrylonitrile)). Especially preferred are polyester subbing layers such as described in European patent application no. 92200907.1. Suitable heat-resistant layers are described in European patent applications nos 91202071.6 (polycarbonates) and 92201619.1 (polyethers). The separate toplayer comprises at least one lubricant e.g. a polyether-polysiloxane copolymer.

The support for the receiver sheet that is used with the dye-donor element may be a transparant film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester. Blue-colored polyethylene terephthalate may also be used as support.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP 144247, EP 227094, EP 228066. The dye-image-receiving layer may also comprise a heat-cured binder such as the reaction product of poly(vinylchloride-vinylacetate-vinylalcohol) and polyisocyanate.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished e.g. by heating for about several milliseconds at a temperature of 400° C.

When the process is performed for but one single color, a monochrome dye transfer image is obtained, which consists of at least one dye according to the present invention. A multicolor image can be obtained by using a doner element containing three or more primary color dyes, one of which consists of at least one dye according to the present invention, and sequentially performing the process steps described above for each color. After the first dye has been transferred, the elements are peeled apart. A second dye-donor element (or another area of the donor element with a different dye area) is then brought in register with the dye-receiving element and the process is repeated. The third color and optionally further colors are obtained in the same manner.

Instead of thermal heads, laser light, infrared flash or heated pens can be used as the heat source for supplying heat energy. Thermal printing heads that can be used to transfer dye from the dye-donor elements of the present invention to a receiver sheet are commercially available.

The present invention is also applicable in a resistive ribbon type dye-donor element for use in a thermal printing process using an electrode head, the so-called R2T2 printing.

The following examples are provided to illustrate the invention in more detail without limiting, however, the scope thereof.

EXAMPLE 1: Synthesis of dye 3

Dye A was prepared according to U.S. Pat. Nos. 4395544 and 4505857.

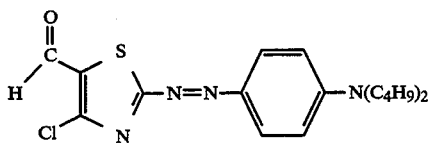

Dye A

A sodium methoxide solution (3.0 mole) was added at room temperature to a suspension of 569 g (1.5 mole) of Dye A in 5.69 l of methanol. The suspension was heated to 50° C. for 4 hours, cooled to 0° C. and filtered. The product was stirred in a mixture of 5 l of water and 10 ml of acetic acid for 2.5 hours. The product was filtered and washed with a mixture of water/methanol. The product was crystallised from ethyl acetate to give 396g of dye 3 (71%). Melting point=151° C.

EXAMPLE 2: Synthesis of dye 34

9.4 g (25 mmole) of dye 3 and 3.5 g (50 mmole) hydroxylamine hydrochloride were dissolved in a mixture of 20 ml of toluene, 100 ml of methanol and 7 ml (50 mmole) of triethylamine. The solution was heated to reflux and 25 ml of solvent were distilled over 20 minutes. The solution was cooled to 0° C. and 25 ml of methanol was added. The product was filtered and washed with methanol. 9.3 g of dye 34 were obtained (96%).

EXAMPLE 3: Synthesis of dye 63

15.6 g of dye 34 were dissolved in 19 ml of acetic anhydride. The solution was heated to 120° C. for 30 minutes and then poured into 100 ml of methanol. The product was filtered and washed with methanol. 12.8 g of dye 63 were obtained (90 %). Melting point=152° C.

EXAMPLE 4: Synthesis of dye 38

3.9 g (10 mmole) of dye 34 and 0.8 ml (11 mmole) of acetyl chloride were dissolved in 25 ml of dichloromethane at room temperature. 0.9 ml (11 mmole) of pyridine were added dropwise and the reaction mixture was stirred for one hour. After concentration under reduced pressure the residue was crystallized from methanol to yield 4.0 g of dye 38.

EXAMPLE 5: Synthesis of dye 36

A solution of 15 g (40 mmole) of dye 3, 6.7 g (80 mmole) of methoxylamine hydrochloride and 11 ml (80 mmole) of triethylamine in 100 ml of methanol was heated to 50° C. for one hour. The suspension was cooled to 5° C., filtered and washed with methanol. The product was stirred in a mixture of 200 ml water, 5 ml of acetic acid and 20 ml of methanol. The precipitate was filtered and washed with water/methanol (1/1). The product was crystallized from methanol to yield 14.2 g of dye 36 (88%). Melting point of dye 36 is 130° C.

EXAMPLE 6: Synthesis of dye 30

3.74 g (10 mmole) of dye 3, 0.91 ml (12 mmole) of N,N-dimethylhydrazine and 0.19 g (1 mmole) of p-toluenesulfonic acid were dissolved in 50 ml of methanol and heated to 60° C. for one hour. The solution was cooled and concentrated under reduced pressure. The residue was purified by column chromatography with dichloromethane as the eluent. 3.5 g of blue oil (dye 30) were obtained.

EXAMPLE 7: Synthesis of dye 33

3.9 g (10 mmole) of dye 34 was suspended in 50 ml of dichloromethane. 1.3 ml (11.5 mmole) of phenyl isocyanate was added at 22° C. The mixture was stirred for 30 minutes. 50 ml of methanol was added and the mixture was concentrated under reduced pressure at 20° C. until crystallization started. The mixture was cooled to 0° C. and filtered. After drying at room temperature, the product was purified by column chromatography using dichloromethane/ethyl acetate (98/2) as the eluent. 2.5 g of dye 33 were obtained.

EXAMPLE 8: Synthesis of dye 15

A solution of 150 g of dye 3 (0.4 mole), 33 g (0.5 mole) of malonitrile and 2.5 ml of triethylamine in 1.5l of dichloromethane was stirred for 16 hours. The solvent was removed under reduced pressure and the residue was crystallized from ethyl acetate. 140 g of dye 15 were obtained (83%). Melting point of dye 15 is 177° C.

EXAMPLE 9: Synthesis of dye 12

0.72 g (11 mmole) of potassium cyanide was added to a solution of 4.2g (10 mmole) of dye 15 in 25 ml of dimethylsulfoxide. After 5 minutes 3.1g (12 mmole) of iodine was added and the solution was stirred for 30 minutes. The solution was poured in methanol/water (3/7) and the precipitate was filtered, washed with methanol and purified by column chromatography using dichloromethane as the eluent. The product was further purified by crystallization from methanol to obtain 3.86 g of dye 12 (86%). Melting point of dye 12 is 184° C.

EXAMPLE 10: Synthesis of dye 16

A solution of 7.5 g (20 mmole) of dye 3, 4 g (35 mmole) of ethyl cyanoacetate and 0.14 ml (0.1 mmole) of triethylamine in 150 ml of dichloromethane was stirred for 4 hours at 40° C. The solvent was removed under reduced pressure and the residual oil was crystallized from ethanol to obtain 8.15 g of dye 16 (86%). Melting point of dye 16 is 170° C.

EXAMPLE 11: Synthesis of dye 32

0.8 ml (10 mmole) of pyridine was added dropwise to a suspension of 3.89 g (10 mmole) of dye 34 and 1 ml (11 mmole) of ethyl chloroformate in 50 ml of dichloromethane at room temperature. The solution was stirred for one hour. 25 ml of ethanol were added and dichloromethane was removed under reduced pressure at 15° C. The precipitate was filtered, and crystallized from methylacetate-hexane. 0.45 g of dye 32 were obtained.

EXAMPLE 12: Synthesis of dye 37

0.40 g (8 mmole) of sodium hydride was added to a solution of 2.92g (7.5 mmole) of dye 34 in 25 ml of dimethylacetamide at room temperature. The solution was stirred for 30 minutes followed by the dropwise addition of 0.75 ml (8 mmole) of 2-bromo-propane. The solution was stirred for 30 minutes and poured into a mixture of 2 ml of acetic acid, 20 ml of methanol and 40 ml of ice-water. The precipitate was filtered and purified by column chromatography using dichloromethane as the eluent. 2.35 g of dye 37 were obtained (73%). Melting point of dye 37 is 178° C.

EXAMPLE 13: Synthesis of dye 4

Dye B was prepared according to U.S. Pat. Nos. 4395544 and 4505857.

Dye B

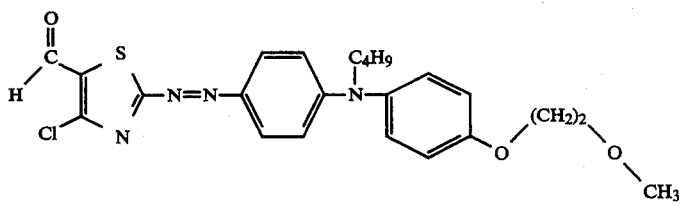

A sodium methoxide solution (60 mmole) was added at room temperature to a suspension of 14.7 g (30 mmole) of Dye B in 150 ml of methanol. The suspension was heated to 55° C. for one hour, cooled to 0° C. and poured into a mixture of 500 ml of water and 10 ml of acetic acid. The product was extracted with ethyl acetate; the organic layer was washed with water and a saturated sodium chloride solution. After concentration the product was further purified by column chromatography using dichloromethane as the eluent. 2.2 g of pure dye 4 were obtained (15%). Melting point of dye 4 is 147° C.

EXAMPLE 14

The absorption maxima ($\lambda_{max}$) and molar extinction coefficients ($\epsilon$) of the dyes identified below were determined in methanol. The results are listed in table 4.

TABLE 4

| Dye | $\lambda_{max}$ (nm) | $\epsilon$ (mol$^{-1}$cm$^{-1}$ l) |
|---|---|---|
| 3 | 577 | 51573 |
| 4 | 563 | 45939 |
| 15 | 650 | 61108 |
| 16 | 633 | 52127 |
| 30 | 580 | 43763 |
| 31 | 555 | 48864 |
| 32 | 568 | 50242 |
| 33 | 567 | 46519 |
| 35 | 550 | 42087 |
| 36 | 556 | 47273 |
| 37 | 557 | 44715 |
| 38 | 560 | 48233 |
| 63 | 559 | 52748 |
| 12 | 720 | 73401 |
| 79 | 650 | 58239 |

EXAMPLE 15

Receiver sheets were prepared as follows:

A 175 μm thick polyethylene terephthalate film was coated from methylethylketone with a dye image receiving layer which contains 3.6 g/m² poly(vinylchloride-co-vinylacetate-co-vinylalcohol) (Vinylire VAGD supplied by Union Carbide), 0.336 g/m² diisocyanate (Desmodur VL supplied by Bayer AG) and 0.2 g/m² hydroxy modified polydimethylsiloxane (Tegomer HSI 2111 supplied by Goldschmidt).

Dye-donor elements for use according to thermal dye sublimation transfer were prepared as follows:

A solution comprising the dye(s) in a concentration of 0.3 wt. % and 0.5 wt. % of poly(styrene-co-acrylonitrile) (Luran 3885, BASF, Germany) as binder in methyl ethyl ketone as solvent was prepared. From this solution a dye layer having a wet thickness of 100 μm was coated on a 6 μm thick polyethylene terephthalate film support provided with a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid and glycerol. On top of this subbing layer, a heat-resistant layer was coated from methylethylketone, containing 0.5 g/m² of a polycarbonate having the following structure:

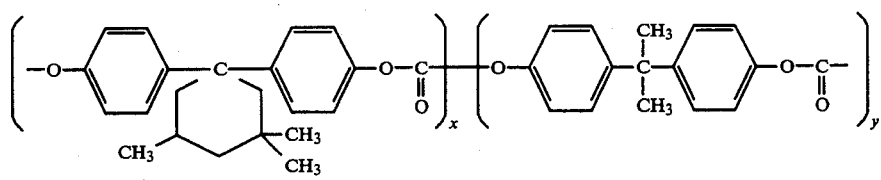

wherein x=55 mol % and y=45 mol %.

On top of said polycarbonate layer, a topcoat layer of polyether modified polydimethylsiloxane (Tegoglide 410, Goldschmidt) was applied from isopropanol.

The dye-donor element was printed in combination with the receiving sheet in a Mitsubishi colour video printer CP100E.

The receiver sheet was separated from the dye-donor element and the color density of the recorded image was measured by means of a Macbeth TR 924 densitometer in the red and/or green region in Status A mode, and the results are given in Table 5.

TABLE 5

| Dye | Density/filter Red | Green |
|---|---|---|
| 3 | 1.46 | 1.20 |
| 15 | 0.82 | |
| 16 | 0.65 | |
| 30 | 0.79 | |
| 32 | 0.57 | 0.64 |
| 35 | | 0.75 |
| 38 | 0.66 | 0.73 |
| 63 | | 1.40 |
| 36 | | 1.05 |

EXAMPLE 16

This example illustrates the use of the present dyes in black mixtures.

Dye-donor elements and receiver sheets were prepared as described in example 15. The formulas of the compounding dyes are given furtheron.

The dye-donor elements were printed in combination with the receiver sheets as described in example 15 and the color densities of the recorded images were measured by means of a Macbeth TR 924 densitometer behind red, green, blue and visual filters.

The results are given in Table 6.

TABLE 6

|     | Dyes | wt % | R | Gr | B | Vis |
|-----|------|------|------|------|------|------|
| (1) | D 3  | 0.5  | 2.76 | 1.99 | 1.82 | 2.27 |
|     | C 1  | 0.3  |      |      |      |      |
|     | Y 1  | 0.3  |      |      |      |      |
| (2) | D36  | 0.5  | 2.09 | 2.14 | 1.88 | 2.23 |
|     | C 2  | 0.3  |      |      |      |      |
|     | Y 1  | 0.3  |      |      |      |      |
| (3) | D63  | 0.5  | 2.43 | 2.60 | 1.92 | 2.61 |
|     | C 1  | 0.3  |      |      |      |      |
|     | Y 1  | 0.3  |      |      |      |      |
| (4) | D 3  | 0.15 | 1.82 | 1.77 | 1.66 | 1.81 |
|     | D36  | 0.2  |      |      |      |      |
|     | C 2  | 0.225|      |      |      |      |
|     | Y 2  | 0.1  |      |      |      |      |
|     | Y 3  | 0.2  |      |      |      |      |
| (5) | D 3  | 0.15 | 1.84 | 1.76 | 1.64 | 1.81 |
|     | D36  | 0.2  |      |      |      |      |
|     | C 2  | 0.225|      |      |      |      |
|     | Y 2  | 0.1  |      |      |      |      |
|     | Y 4  | 0.2  |      |      |      |      |

Dye Y1 was synthesized according to U.S. Pat. No. 5043316, dye Y2 was synthesized according to the description given in our copending European patent application filed on the same day as the present application.

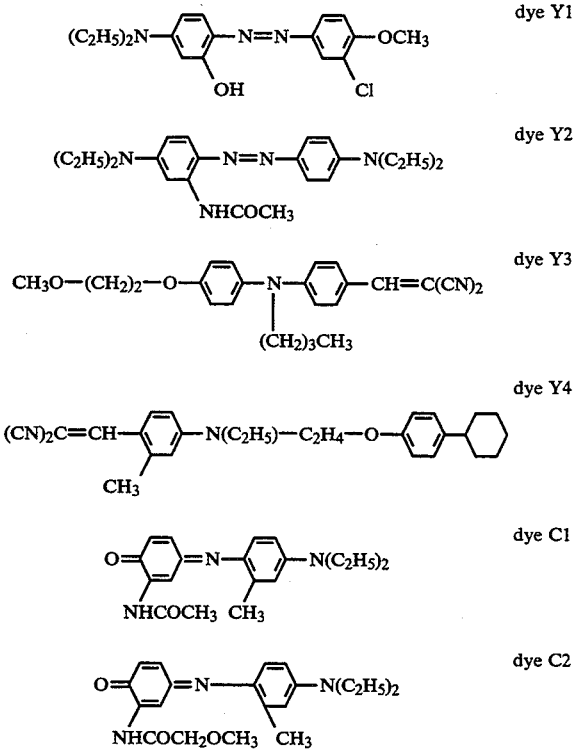

I claim:

1. Dye-donor element for use according to thermal dye sublimation transfer, said dye-donor element comprising a support having thereon a dye layer containing a thiazolylazoaniline dye, characterized in that said thiazolylazoaniline dye contains on the 4-position of the thiazolyl ring a substituent selected from the group consisting of hydroxy, alkoxy, cycloalkoxy, aryloxy, mercapto, thioalkyl, thiocycloalkyl and thioaryl.

2. Dye-donor element according to claim 1, wherein said thiazolylazoaniline dye according to the following formula (I)

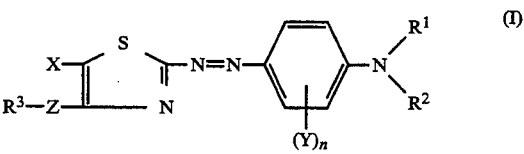

wherein
X represents CN or $R^4-C=A$;
Y represents any substituent;
Z represents O or S;
n represents 0, 1, 2, 3 or 4, the Y substituents being the same or different when n is greater than 1;
A represents O, N—$R^5$, $CR^6R^7$;
$R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;
$R^3$ represents hydrogen, substituted or unsubstituted alkyl, substituted or unsubstituted cycloalkyl, substituted or unsubstituted aryl;
$R^4$ represents hydrogen or an electron withdrawing group;
$R^5$ represents H, CN, $NR^8R^9$, $OR^8$, $OCOR^8$, $OCOOR^8$, $OCONR^8R^9$, $OSO_2R^8$, $OPO(OR^8)(OR^9)$;
$R^6$ and $R^7$ independently represent an electron withdrawing group;
$R^8$ and $R^9$ independently represent hydrogen, substituted or unsubstituted alkyl, substituted or unsubstituted aryl, substituted or unsubstituted cycloalkyl or $R^8$ and $R^9$ together represent the atoms necessary for completing a heterocyclic nucleus or substituted heterocyclic nucleus.

3. Dye-donor element according to claim 2, wherein Z represents O and $R^3$ represents methyl.

4. Dye-donor element according to claim 3, wherein X represents CN or CHO or CH=C(CN)$_2$ or C(CN)=C(CN)$_2$ or CH=N—OCH$_3$ or CH=N—OH, n is 0 and $R^1$ and $R^2$ both represent alkyl.

5. Dye-donor element according claim 1, wherein the dye layer contains copoly-styrene-acrylonitrile as binder.

6. Dye-donor element according to claim 1, wherein said dye donor element is of magenta or cyan hue.

7. Dye-donor element according to claim 1, wherein said dye donor element is of black hue.

8. Dye-donor element according to claim 7, wherein said dye layer contains at least one of said magenta thiazolylazoaniline dyes and further contains a cyan indoaniline dye, a yellow dicyanovinylaniline dye and a yellow bis(N,N-dialkylaniline)azo dye.

9. Dyed receiving element comprising a support provided with a dye image receiving layer containing dyes in imagewise distribution, formed by thermal dye sublimation transfer using a dye-donor element comprising a support having thereon a dye layer containing a thiazolylazoaniline dye, characterized in that said thiazolylazoaniline dye contains or, the 4-position of the thiazolyl ring a substituent selected from the group consisting of hydroxy, alkoxy, cycloalkoxy, aryloxy, mercapto, thioalkyl, thiocycloalkyl and thioaryl.

10. Dyed receiving element comprising a support provided with a dye receiving layer containing dyes in image wise distribution, formed by thermal dye sublimation transfer using a dye-donor element comprising a thiazolylazoaniline dye according to the following formula (I)

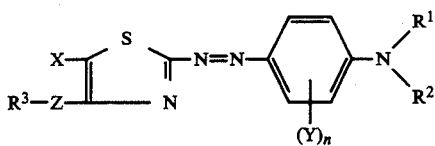

wherein
X represents CN or $R^4-C=A$;
Y represents any substituent;
Z represents O or S;
n represents 0, 1, 2, 3 or 4, the Y substituents being the same or different when n is greater than 1;
A represents O, N—$R^5$, $CR^6R^7$;
$R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;
$R^3$ represents hydrogen, substituted or unsubstituted alkyl, substituted or unsubstituted cycloalkyl, substituted or unsubstituted aryl;
$R^4$ represents hydrogen or an electron withdrawing group;
$R^5$ represents H, CN, $NR^8R^9$, $OR^8$, $OCOR^8$, $OCOOR^8$, $OCONRBR^9$, $OSO_2R^8$, $OPO(OR^8)(OR^9)$;
$R^6$ and $R^7$ independently represent an electron withdrawing group;
$R^8$ and $R^9$ independently represent hydrogen, substituted or unsubstituted alkyl, substituted or unsubstituted aryl, substituted or unsubstituted cycloalkyl or $R^8$ and $R^9$ together represent the atoms necessary for completing a heterocyclic nucleus or substituted heterocyclic nucleus.

* * * * *

UNITED STATES PATENT AND TRADEMARK OFFICE
CERTIFICATE OF CORRECTION

PATENT NO. : 5,366,951
DATED : November 22, 1994
INVENTOR(S) : Luc Vanmaele

It is certified that error appears in the above-indentified patent and that said Letters Patent is hereby corrected as shown below:

On the title page: Item

[75] Inventor: "Lochristi," should read -- Lochristi, Belgium --;

[73] Assignee: "Mortsel," should read -- Mortsel, Belgium --;

Column 1, line 53, "84/227948." should read -- 84/227948, --;

Column 1, line 55, "JP 85/229795. JP 86/41596." should read -- JP 85/229795, JP 86/41596, --;

Column 2, line 38, "when n i s greater" should read -- when n is greater --;

UNITED STATES PATENT AND TRADEMARK OFFICE
CERTIFICATE OF CORRECTION

PATENT NO. : 5,366,951
DATED : November 22, 1994
INVENTOR(S) : Luc Vanmaele

It is certified that error appears in the above-indentified patent and that said Letters Patent is hereby corrected as shown below:

Column 10, line 2, "EP 133011." should read -- EP 133011, --;

Column 13, line 64, "(Vinylire VAGD" should read -- (Vinylite VAGD --;

Column 17, line 7, "contains or, the 4-position" should read -- contains on the 4-position --;

Column 18, line 20, "OCONRBR$^9$," should read -- OCONR$^8$R$^9$, --.

Signed and Sealed this

Fourth Day of April, 1995

Attest:

BRUCE LEHMAN

*Attesting Officer*     *Commissioner of Patents and Trademarks*